United States Patent Office 3,355,418
Patented Nov. 28, 1967

3,355,418
STABILIZATION OF METHYL METHACRYLATE AND COPOLYMERS AGAINST DISCOLORATION WITH ORGANIC PHOSPHITES
Lars Ove Oldsberg, Perstorp, Sweden, assignor to American Cyanamid Company, Stamford, Conn., a corporation of Maine
No Drawing. Filed Dec. 23, 1964, Ser. No. 420,811
2 Claims. (Cl. 260—45.7)

ABSTRACT OF THE DISCLOSURE

An improved method for the production of polymers of methyl methacrylate containing at least 85%, by weight, of methyl methacrylate and up to 15%, by weight, of a different acrylate, wherein an aqueous suspension of the methacrylate is formed, the suspension is heated to at least about 60° C. in the presence of a free-radical generating catalyst and the resultant polymer is recovered and extruded into pellets, which comprises adding thereto, prior to extrusion, 0.05% to about 0.5%, by weight, based on the weight of the polymer, the tridecyl phosphite is disclosed.

The suspension polymerization or aqueous dispersion polymerization of methyl methacrylate to form homopolymers or copolymers thereof is well known in the art. The procedures comprise forming methyl methacrylate droplets in water with the air of a suspension agent and/or granulating agent and polymerizing the monomer, while in said condition, in the presence of a free-radical generating catalyst at a temperature of at least about 60° C. The methyl methacrylate polymerizes in the form of "beads" or spherical particles which may be recovered by filtration, centrifugation, etc., washed and dried. The resultant beads may then be molded into various shaped articles suitable for the commercial trade, but are more commonly extruded into pellet form and sold, as such, for subsequent molding. At this point in the commercially practiced precedures, i.e., immediately after extrudation, the pellets are water-white, however, after storage for various lengths of time, molding of the pellets results in the formation of molded articles having a yellow color, the intensity of which increases as the storage time of the pellets increases. That is to say, upon molding the extruded pellets, articles are produced which are yellow in color and the longer the pellets are stored, the yellower are the articles produced. Such a color is undesirable and materially detracts from the commercial attractiveness of the moldable pellets.

I have now found that moldable pellets of methyl methacrylate polymers produced by the so-called "bead process" can be stabilized against discoloration by the addition thereto of an organic phosphite having the formula (I)

wherein R, R¹ and R² are, individually, a phenyl radical or an alkyl radical having from about 6 to 18 carbon atoms, inclusive. Moreover, not only have I found that the addition of the above phosphites to the methyl methacrylate polymer stabilizes the polymer pellets against discoloration, but I have also found that the splash mark temperature of the resultant stabilized polymer is materially and unexpectedly increased.

It is therefore an object of the present invention to provide a novel process for producing color stable methyl methacrylate polymers having high splash temperatures.

It is a further object of the present invention to provide a novel process for preventing the discoloration and improving the splash mark temperature of methyl methacrylate polymer pellets by adding thereto a phosphite compound represented by Formula I, above.

It is still a further object of the present invention to provide color stable polymers of methyl methacrylate which have high splash mark temperatures.

These and other objects will become more apparent to those skilled in the art upon reading the more detailed description of the instant invention set forth hereinbelow.

THE NOVEL PROCESS

As mentioned above, I have found that the addition of various organic phosphites not only stabilizes methyl methacrylate polymer pellets produced by "bead processes" against discoloration but also materially improves the splash mark temperature thereof.

This improvement is observed not only in homopolymeric methyl methacrylate but also in copolymers thereof with up to 15% of an acrylic or methacrylic monomer copolymerizable therewith. Examples of such acrylic comonomers include those having the formula (II)

wherein R is hydrogen or a methyl group and R¹ is an alkyl group of 1–12 carbon atoms, inclusive. Examples of monomers represented by Formula II include methyl acrylate, ethyl acrylate, propyl acrylate, isopropyl acrylate, butyl acrylate, t-butyl acrylate, isobutyl acrylate, amyl acrylate, hexyl acrylate, cyclohexyl acrylate, heptyl acrylate, octyl acrylate, decyl acrylate, undecyl acrylate, dodecyl acrylate and their corresponding methacrylates and isomers.

The organic phosphites useful in the practice of the present invention and represented by Formula I, above, include triphenyl phosphite, diphenyl cyclohexyl phosphite, diphenyl n-hexyl phosphite, diphenyl heptyl phosphite, diphenyl octyl phosphite, diphenyl nonyl phosphite, diphenyl decyl phosphite, diphenyl undecyl phosphite, diphenyl dodecyl phosphite, diphenyloctadecyl phosphite, diphenylpentadecyl phosphite, phenyl dihexyl phosphite, phenyl dicyclohexyl phosphite, phenyl diheptyl phosphite, phenyl dioctyl phosphite, phenyl dinonyl phosphite, phenyl didecyl phosphite, phenyl diundecyl phosphite, phenyl didodecyl phosphite, phenyl dioctadecyl phosphite, phenyl dipentadecyl phosphite, phenyl hexyloctyl phosphite, phenyl decylheptyl phosphite, phenyl nonyloctyl phosphite, octyldioctadecyl phosphite, triheptyl phosphite, diheptyloctyl phosphite, trihexyl phosphite, tricyclohexyl phosphite, trioctyl phosphite, tridecyl phosphite, triundecyl phosphite, tridodecyl phosphite, tripentadecyl phosphite, trioctadecyl phosphite, and the like.

The organic phosphite may be added to the methacrylate polymer any time before molding the pellets produced by extruding the beads. That is to say, the organic phosphite may be added during the polymerization per se, after the polymerization, during the extruding of the polymer composition into pellets or after extrusion, but before extensive storage of the pellets, in amounts ranging from about 0.05% to about 0.5%, preferably 0.1% to about 0.3%, by weight, based on the weight of the methyl methacrylate polymer. It is preferred, however, that the organic phosphite be added to the polymer after polymerization and prior to extrusion into pellets. The addition of the phosphite may be accomplished merely by contacting the polymer with the liquid phosphite or, alternatively, if the phosphite is solid or semi-solid, a solution of the polymer may be formed and the phosphite added thereto. Mixtures of phosphites represented by Formula I may, of course, also be used.

As mentioned above, the procedures for producing "bead" polymers of methyl methacrylate are well known in the art. Many methods for the production thereof, have been devised, each distinguishing from the other, however, in some minor feature which tends to increase yield, contact time, etc., of the prior art systems. Basically, the polymerization is carried out by suspending the methyl methacrylate in an aqueous vehicle in the presence of a catalyst and heating the reaction media to a temperature sufficient to initiate the polymerization. The procedures have been carried out utilizing such suspension stabilizers as poly(sodium methacrylate), polyvinyl alcohol, poly(sodium acrylate), polyvinyl acetate and the like with added buffers such as disodium acid phosphate to maintain the pH at 7-9 and granulating agents and anticlustering agents such as sodium hypophosphite. A typical "bead"-type polymerization process is set forth in more detail in U.S. Patent No. 2,565,141, which patent is hereby incorporated herein by reference.

By the term "Splash Mark Temperature" as used in the instant specification and in the example set forth hereinbelow, is meant that melt temperature during injection molding at which the molded product shows signs of bubbles or surface defects due to polymer decomposition. Such a defect is readily observable to a skilled chemist with the naked eye.

The following examples are set forth for purposes of illustration only and are not to be construed as limitations on the instant invention except as set forth in the appended claims. All parts and percentages are by weight unless otherwise specified.

Example 1

To a suitable reaction vessel equipped with stirrer and baffles are added:

| | Parts |
|---|---|
| Methyl methacrylate | 700 |
| Ethyl acrylate | 21 |
| Stearyl alcohol | 7 |
| Azobisisobutyronitrile | 1.4 |
| Dodecyl mercaptan | 2.8 |
| Phenyl didecyl phosphite | 1.4 |

To this "monomer phase" is then added an "aqueous phase" of:

| | Parts |
|---|---|
| Deionized water | 773 |
| 1% solution of poly(sodium methacrylate) | 31 |
| Na₂HPO₄ (anh.) | 2 |

The mixture is purged with nitrogen and brought to 83° C. under vigorous agitation. Due to the heat of polymerization, the temperature is maintained steady without further heating until, after about an hour, the temperature increases to 90–95° C. The reaction mixture is then heated to 100° C. and maintained at said temperature for 10 minutes. After cooling to room temperature, the mixture is filtered and slurried in water. The resultant poly(methyl methacrylate) beads are dried and tested for heat stability.

The heat stability test is conducted as follows: A portion of the beads are sealed in glass tubes under nitrogen and heated at 210° C. for one hour. The seal is broken, and the nitrogen is replaced with oxygen. The tube is then heated at 80° C. for 16 hours. The oxygen is then replaced with nitrogen, the tube sealed and heated at 250° C. for 16 hours. The sample is then removed from the tube and compression molded to ½ x ½ x 5 inch bar, which is inspected for discoloration (yellowing). The results are set forth below in Table I along with other polymer-phosphite products.

TABLE I

| Ex. | Polymer | Phosphite | Conc. Phosphite, Percent | Color of Polymer [1] |
|---|---|---|---|---|
| 1 | MMA/EA cop., 97/3. | PDP | | 1 |
| 2 | Same as 1 | DPDP | 0.05 | 1. |
| 3 | ---do--- | TPP | 0.2 | 2 |
| 4 | ---do--- | TDP | 0.2 | 2 |
| 5 | ---do--- | TDP | 0.4 | 1 |
| 6 | ---do--- | TIOP | 0.05 | 2 |
| 7 | ---do--- | TOP | 0.3 | 3 |
| 8 | ---do--- | TOP | 0.4 | 1.5 |
| 9 | ---do--- | (−[2]) | | 5 |
| 10 | PMMA | DPHP | 0.3 | 2 |
| 11 | MMA/bma cop., 85/15. | DOODP | 0.05 | 3 |
| 12 | PMMA | DPPDP | 0.5 | 1 |

[1] Color scale values: 1—water-white; 10—black.
[2] Control
cop.—copolymer
MMA—methyl methacrylate
EA—ethyl acrylate
PMMA—polymethylmethacrylate
bma—t-butyl methacrylate
PDP—phenyldidecyl phosphite
DPDP—diphenyldecyl phosphite
TPP—triphenyl phosphite
TDP—tridecyl phosphite
TIOP—triisooctyl phosphite
TOP—trioctadecyl phosphite
DPHP—diphenyl n-hexyl phosphite
DOODP—dioctyloctadecyl phosphite
DPPDP—diphenylpentadecyl phosphite Following the procedure of Example 1, except that the phosphite was added to the polymer beads as a liquid, the beads were extruded into pellets and tested for color stability as described in said example. The results are set forth in Table II below.

TABLE II

| Ex. | Polymer | Phosphite | Conc. Phosphite, Percent | Color of Polymer [1] |
|---|---|---|---|---|
| 13 | MMA/EA cop., 97/3. | PDP | 0.3 | 3 |
| 14 | Same as 13 | PDP | 0.5 | 1 |
| 15 | ---do--- | (−[2]) | | 5 |
| 16 | PMMA | TPP | 0.2 | 2 |
| 17 | PMMA | TOP | 0.3 | 3 |
| 18 | PMMA | DOODP | 0.05 | 3 |

Code.—Same as Table I.

Again following the procedure of Example 1 except that no color stability test under heat was conducted on the polymer compositions, various organic phosphites were added to various polymers. The resultant compositions were extruded into pellets and tested for color stability with age. The results are set forth hereinbelow in Table III.

TABLE III

| Ex. | Polymer | Stabilizer | Stabilizer Percent | Color of Molded Article After Storage* | | | | | Splash Mark Temp. °F. |
|---|---|---|---|---|---|---|---|---|---|
| | | | | 0 wks. | 1 wk. | 5 wks. | 9 wks. | 1 yr. | |
| 19 | MMA/EA cop., 97/3 | PDP | 0.1 | 27 | 27 | -- | 29 | 32.5 | 520 |
| 20 | Same as 19 | PDP | 0.3 | 27 | 27 | -- | 28 | 31 | 535 |
| 21 | ---do--- | TDP | 0.1 | 27 | 27 | 29 | 31 | 34 | 520 |
| 22 | ---do--- | TDP | 0.15 | 27 | -- | 27 | 29 | -- | 525 |
| 23 | ---do--- | TDP | 0.20 | 27 | -- | 27 | 28 | 29.5 | 530 |
| 24 | ---do--- | TDP | 0.30 | 27 | 27 | -- | 28 | -- | 535 |
| 25 | ---do--- | (-²) | -- | 32 | 40 | 48 | 50 | 50 | 500 |
| 26 | PMMA | TDP | 0.1 | 27 | 28 | 30 | 31 | 33 | 520 |
| 27 | MMA/bma cop., 85/15 | PDP | 0.07 | 27 | 28 | 31 | 32 | 35 | 515 |

CODE.—Same as Table I.

*In these tests the organic phosphite was blended with the polymer beads and then extruded into pellets. The pellets were stored in polyethylene bags and samples thereof were removed and periodically molded. The resultant molded articles were then examined for color visually through a 5″ section compared to a standard colorless sample. In the table, 32 or less is a commercially acceptable color value.

I claim:

1. In a method for the production of polymers of methyl methacrylate containing at least 85%, by weight, of methyl methacrylate and up to 15%, by weight, of a different acrylate, wherein an aqueous suspension of the methacrylate is formed, the suspension is heated to at least about 60° C. in the presence of a free-radical generating catalyst and the resultant polymer is recovered and extruded into pellets, the improvement which comprises adding thereto, prior to extrusion, 0.05% to about 0.5%, by weight, based on the weight of the polymer, of tridecyl phosphite.

2. A method according to claim 1, wherein the suspension of methylmethacrylate contains 3% ethyl acrylate.

References Cited

UNITED STATES PATENTS

| | | | |
|---|---|---|---|
| 2,565,141 | 8/1951 | Marks | 260—45.7 |
| 2,779,749 | 1/1957 | Wicklatz | 260—79.3 |
| 3,206,431 | 9/1965 | Doyle et al. | 260—45.7 X |

DONALD E. CZAJA, *Primary Examiner.*

M. WELSH, *Assistant Examiner.*